Patented Aug. 13, 1940

2,210,892

UNITED STATES PATENT OFFICE 2,210,892

PROCESS FOR RECOVERING MAGNESIUM OXIDE

Hellmuth R. Brandenburg, Cowell, Calif.

No Drawing. Application February 9, 1938,
Serial No. 189,627

1 Claim. (Cl. 23—201)

My invention relates to improvements in a process for recovering magnesium oxide, and consists of the steps hereinafter described and claimed.

The cost of producing magnesium oxide from raw material resources such as magnesium bearing salt brines, dolomite and magnesite have been expensive because none of the materials in their natural state are of sufficient purity to lend themselves directly to the manufacture of pure or even relatively pure magnesium compounds. Impurities such as iron, alumina, lime, etc., must be removed by involved and carefully controlled processes. These expensive process procedures are reflected in the relatively high cost of magnesium compounds and the metal produced therefrom.

Up to the present time, certain raw materials from which magnesium compounds might be produced have not been used because they have been regarded as being of too refractory a nature to warrant their consideration as other than merely "potential resources." With my process I am able to use raw materials of a refractory nature and since these raw materials are abundant they are low in price. I refer to such raw materials as hydrous, silicates of magnesium. It is also possible to use any and all of the members of the serpentine group which also includes serpentine.

I have found that when certain hydrous silicates of magnesium, of which serpentine is a classic example, are subjected to heat, haphazardly, the final end product will be new minerals, as for instance, in the case of serpentine, the new minerals will be enstatite and olivine. These latter named minerals are an anhydrous combinations and chemically distinctly inert substances. On the other hand, I have discovered that under carefully controlled conditions, that is within certain minimum and maximum temperature ranges, it is possible to so treat the serpentine as to liberate free or essential free magnesium oxide. The magnesium oxide so liberated can be known as available magnesia. The amount of available magnesia that can thus be liberated by a simple heat treatment, properly conducted, is significant in itself and is sufficient to be of great economic importance, for it is not difficult to make the available magnesia in excess of 30% of the total magnesia content.

Other objects and advantages will appear in the following specification, and the novel features of the device will be particularly pointed out in the appended claim.

The working conditions and temperature effects that will have to be brought to bear in the process will vary within certain limits and are dependent upon the chemical and physical characteristics of the particular magnesium mineral under consideration. The raw material is first ground into small particles and then it is placed in a furnace chamber, kiln or calcining device. The kiln may be of a rotary type, or a roaster may be used of the wedge type. I do not wish to be confined to the particular device used for heating the raw material. The temperature limits to which the material is subjected is between 500° C. and 900 C. I have found that the optimum heat under working conditions is about 700° C. If the temperature exceeds 900° C. a dead burned product will result. The duration of the heating period varies in harmony with the type of material being heated and is further influenced by the particle size of the material, type of furnace used, etc. The heating is continued until the magnesium silicate, calcined as described, will now contain appreciable quantities of magnesia in available form.

The step of heating has turned an essentially neutral product into a highly basic product, the base which is liberated being magnesium oxide, a product that per se did not exist in the untreated or unheated serpentine. The magnesium oxide made thus available is capable of reacting in a manner alike and identical with magnesium oxide, and it is now in an extractable form to a degree that is impossible to accomplish with the untreated material. The heat treated serpentine can be used in many ways because it is now endowed with basic properties. The condition of the mass immediately following calcination, may be described as involving the co-existing presence of a large portion of available magnesium oxide, a loosely bonded magnesium silicate, and probably amorphous silica. Since the liberated magnesium oxide is in a state of close co-mingling with the other products, chemical processes are resorted to in separating the magnesium oxide from what might be termed the waste products.

This calcine may now be suspended in water and directly carbonated by passing carbon dioxide gas through the suspension thus forming bicarbonate of magnesium which is a soluble product. The use of carbon dioxide on serpentine not heated to the critical temperature above mentioned, will fail to give economically worth while results, whereas it gives admirable results on serpentines heated in the manner indicated.

The suspension is now filtered leaving a magnesium salt in a clear solution. The salt may be precipitated from the solution by boiling the solution. The boiling drives out the loosely bonded carbon dioxide gas and precipitates a very pure form of magnesium carbonate. This magnesium carbonate may in turn be ignited to the oxide or converted into any desired magnesium compound, inclusive of that of the metal itself.

The entire process thus far set forth can be briefly explained as follows: The serpentine is subjected to a simple heat treatment and the calcine resulting from this is suspended in water followed in turn by carbonation, filtration and evaporation. I can thus directly and without purification produce a very pure form of a magnesium compound. This magnesium compound can be obtained at a low cost because the raw materials are inexpensive, the method is simple and the process costs are low. The method and process as described is economical and efficacious, and not only that, but the waste product may be diverted into other suitable channels.

The basic properties of the serpentine heated to a critical temperature would make the product suitable for many purposes without the necessity of separating the magnesium oxide. The product could be used where magnesium oxide is now used. On the basis of a low priced substitute for magnesium oxide, such material could enter into the rubber industry as a filler, it could be used in the manufacture of certain types of paints as a dryer, and it also could be used in asphalt roofing manufacture as a cover. The insecticide and fungicide industry could use it for a carrier and it could enter into the formation of basic copper, lead, etc., compounds.

The process may have a few steps added to it which will result in obtaining not only 30% of the magnesia content of the ore, but at least as high as 80%. I have discovered that by intermixing finely ground hydrous magnesium silicate such as serpentine with soda ash, in amounts up to approximately equal proportions of the two, and then calcining the mixture in the manner already described, the resulting product of available magnesia is raised. Optionally, I may intermix and calcine raw serpentine and soda ash or I may take precalcined serpentine and mix it with the soda ash and then again calcine the mixture. It is further possible to substitute potash or any alkali carbonate, for the soda ash with approximately equal effectiveness.

By calcining a mixture of serpentine and soda ash wherein the ratio of the soda ash to the serpentine does not exceed the limits of 1.5 to 1.0, it is possible to obtain a dry and loosely coherent calcine. This calcine readily disintegrates in water, yielding a suspension in which an available magnesia oxide content may be raised in excess of 80% of the total magnesia present in the raw material. In actual practice, I carry through the process and the essential sequence of steps in the manner indicated irrespective of whether I am dealing with the straight mineral material or a mixture of the mineral material and an alkali carbonate.

Summing up the additional steps mentioned in the preceding paragraphs, it will be observed that the raw materials are preferably preground before calcination of the charge within the temperature limits specified is commenced. The pregrinding of the raw materials is absolutely necessary where a mineral and an alkali carbonate mixture is used. After the calcining of the charge, the calcined product is next suspended in water. If it be deemed advisable for the elimination of the eventually present impurities, a filtration may be resorted to and the residue may be resuspended. It is necessary to suspend the calcine materials in a quantity of water adjusted to hold the magnesium bi-carbonate in solution and also any other bicarbonate salts that may be present, such as sodium bicarbonate. Carbon dioxide gas or any gas mixture rich in carbon dioxide, is now forced through the suspension until the reaction is complete and the bicarbonates are fully formed. It is possible to carbonate the suspension under pressure.

The suspended and waste material and the magnesium salt bearing solution are now separated by either filtration, sedimentation, followed by decantation. The magnesium bearing solution freed from all suspended impurities is now evaporated to a point that suffices to precipitate the magnesium in the carbonate form. The magnesium carbonate is filtered off, washed and dried. It may be further calcined to the oxide or converted into any desired magnesium compound or reduced to the metal by suitable means.

So far as I am aware, I am the first one to show that by a simple heat treatment, hydrous magnesium silicates can be dissociated with the formation of available magnesium oxide. These effects can be further enhanced by the coincidental calcination with an alkali carbonate. Although I have set forth a temperature range of 500° C. to 900° C., and a preferred temperature of 700° C., it is possible to work within a constricted range of let us say 700° C., plus or minus 100° C.

The foregoing describes my invention or process in detail so that anyone skilled in the arts may engage in the recovering of the magnesium compounds from the hydrous silicates of magnesium and particularly so from serpentine and members of the serpentine group. The product resulting from the process is a form of available magnesium oxide that responds in its reactivity towards all reagents that magnesium oxide in its pure or purer forms responds to. Although I have shown a simple process for obtaining a certain quantity of magnesium oxide from raw material and a longer process for obtaining a greater quantity of magnesium oxide from the same quantity of raw material, I do not wish to be confined to the exact steps mentioned. The appended claim broadly sets forth the scope of the invention.

I claim:

The herein described method of obtaining free or available magnesium oxide from serpentine which consists in calcining the serpentine at a temperature between 500° to 900° C. to liberate the magnesium oxide, suspending the calcine in water while passing carbon dioxide gas through the suspension for forming bicarbonate of magnesium in solution, in filtering to separate said bicarbonate of magnesium solution from the residue, in evaporating the filtrate thus obtained to precipitate magnesium carbonate, in filtering to separate the thus precipitated magnesium carbonate, in heating the magnesium carbonate to obtain magnesium oxide.

HELLMUTH R. BRANDENBURG.